United States Patent [19]

Saccon

[11] Patent Number: 5,010,682
[45] Date of Patent: Apr. 30, 1991

[54] ANIMAL TRAP

[76] Inventor: Gino Saccon, 1625 Kent/Des-Moines Rd., Seattle, Wash. 98188

[21] Appl. No.: 557,189

[22] Filed: Jul. 24, 1990

[51] Int. Cl.$^5$ .......................................... A01M 23/30
[52] U.S. Cl. ........................................ 43/81; 43/77; 43/80
[58] Field of Search ................... 43/81, 78, 77, 79, 80

[56] References Cited

U.S. PATENT DOCUMENTS

| | | |
|---|---|---|
| 81,023 | 8/1868 | Smith . |
| 121,468 | 12/1871 | Polley . |
| 353,657 | 12/1886 | Bean . |
| 549,814 | 11/1895 | Nolan . |
| 615,851 | 12/1898 | Hooker . |
| 621,396 | 3/1899 | Williams ............................. 43/81 |
| 975,098 | 11/1910 | Wyman . |
| 1,077,850 | 11/1913 | Mebane . |
| 1,196,694 | 8/1916 | Ink . |
| 1,221,679 | 4/1917 | Chodakovski . |
| 1,332,360 | 3/1920 | Roy . |
| 1,377,441 | 5/1921 | Roy . |
| 1,436,833 | 11/1922 | Ullman . |
| 1,476,529 | 12/1923 | Lutz . |
| 1,764,225 | 6/1930 | Raymond . |
| 2,059,453 | 11/1936 | Hain ..................................... 43/91 |
| 2,394,032 | 2/1946 | Warren ................................ 43/88 |
| 2,432,723 | 12/1947 | Carpenter ........................... 43/88 |
| 2,593,816 | 4/1952 | Vigness ............................... 43/88 |
| 2,598,974 | 6/1952 | Conrad ................................ 43/80 |
| 2,638,700 | 5/1953 | Nantt .................................. 43/80 |
| 3,408,765 | 11/1968 | Caryl ................................... 43/88 |
| 3,760,530 | 9/1973 | Dahlgren ............................ 43/88 |
| 3,816,955 | 6/1974 | Conibear ............................ 43/90 |
| 3,971,155 | 7/1976 | Conibear ............................ 43/90 |
| 4,492,055 | 1/1985 | Benz .................................... 43/88 |
| 4,578,893 | 4/1986 | Wickenberg ...................... 43/81 X |
| 4,817,313 | 4/1989 | Falzon et al. ...................... 43/88 |
| 4,918,855 | 4/1990 | Simpson ............................. 43/77 X |

Primary Examiner—Richard K. Seidel
Assistant Examiner—Patty E. Hong
Attorney, Agent, or Firm—Glenn D. Bellamy

[57] ABSTRACT

An animal trap (10) including a spring (16) with first and second arm members (18, 20) extending from the spring (16) to outward ends (22, 26) such that the outward ends (22, 26) are biased apart by the spring (16). A loop portion (24) is positioned on the outward end (22) of the first arm member (18) and substantially encircles the outward end (26) of the second arm member (20). A jaw portion (28) on the second arm member (20) is positioned to be biased toward a side (30) of the loop portion (24) which is opposite the first arm member (18). A trigger member (32) is movably carried on the first arm member (18) and includes a paddle portion (38) and a detent portion (36). The paddle portion (38) is positionable in substantially axial alignment with the loop portion (24) when the detent portion (36) is holding the outward end (26) of the second arm member (20) in a set position relatively adjacent the outward end (22) of the first arm member (18). In this position, there is stored spring energy such that movement of the trigger member (36) will release the outward end (26) of the second arm member (20) causing the jaw portion (28) to be moved by the spring (16) across the loop portion (24) toward the side (30) opposite the first arm member (18) to forcefully clamp the animal (14) within the loop portion (24).

2 Claims, 2 Drawing Sheets

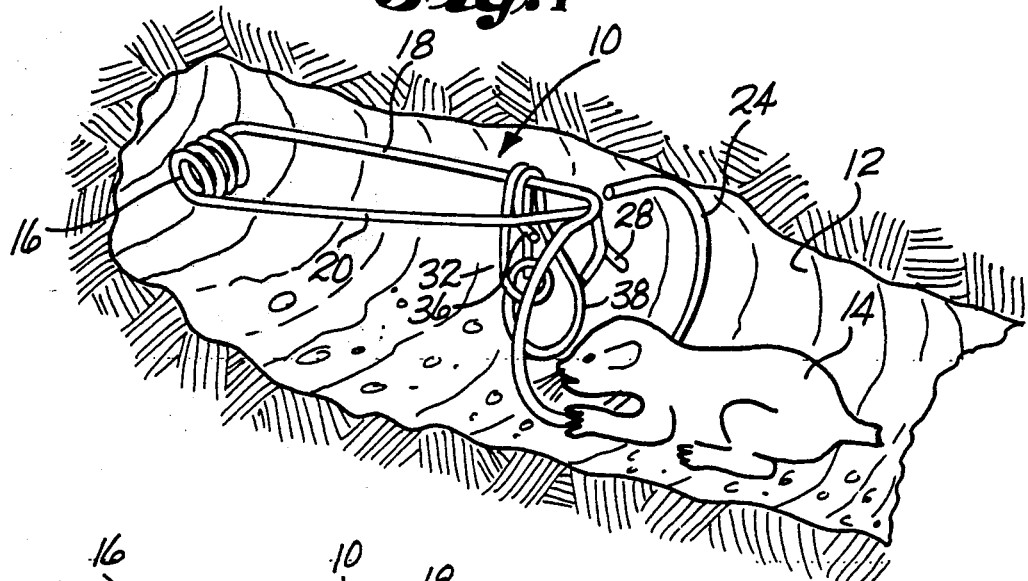
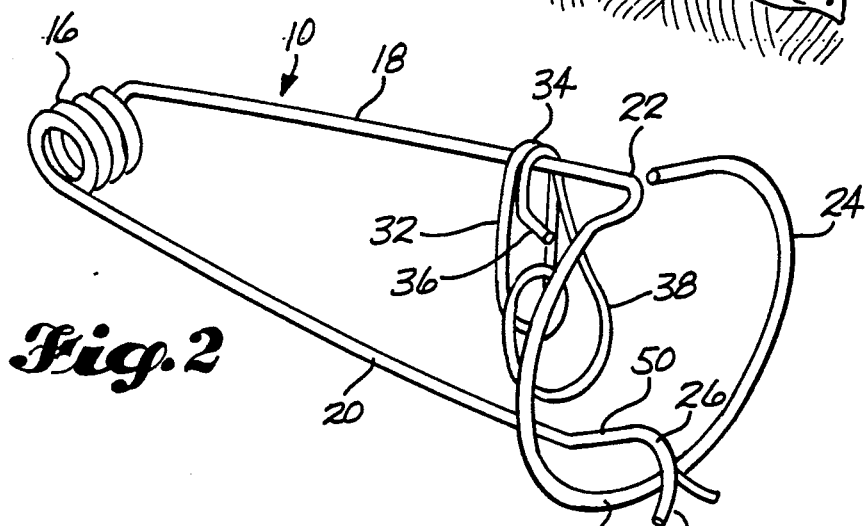
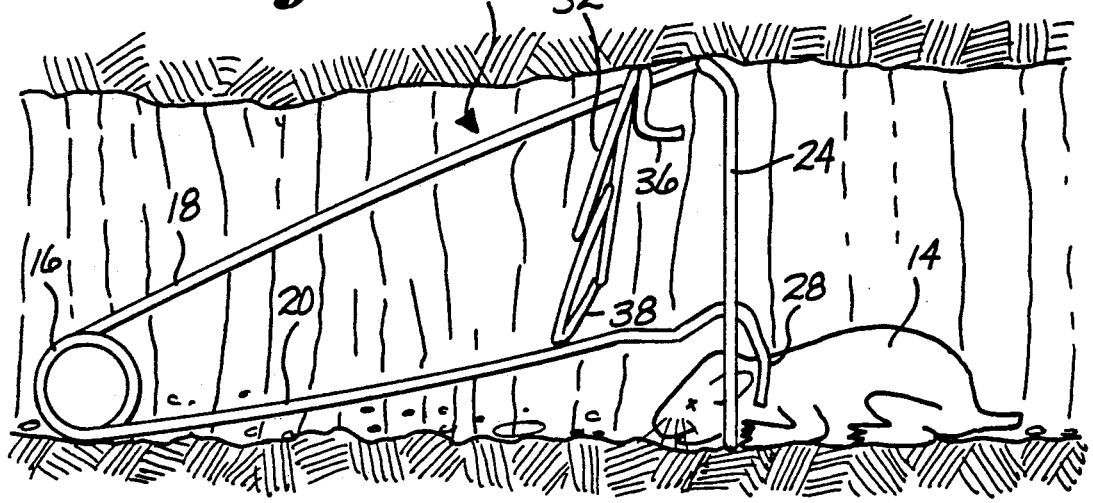

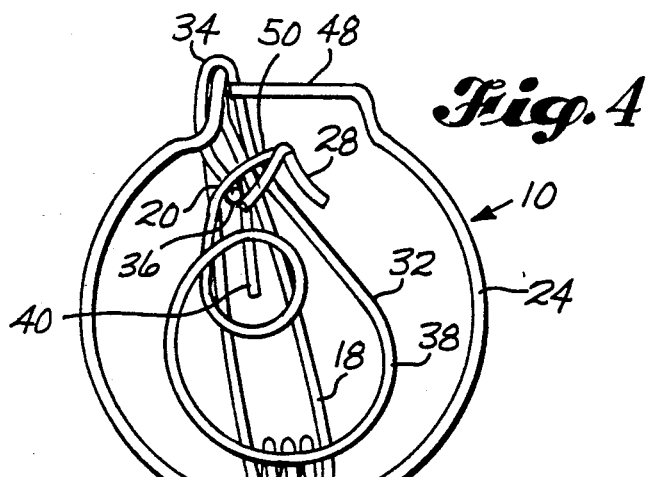
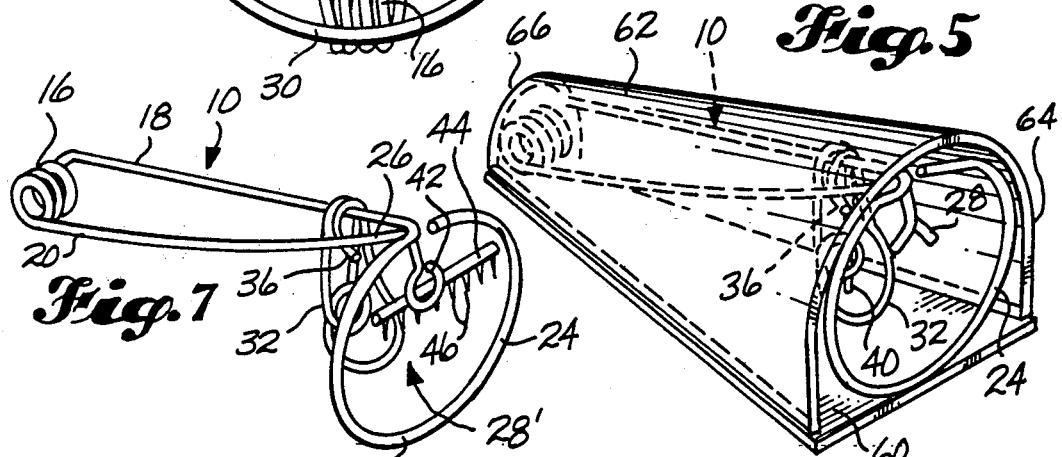
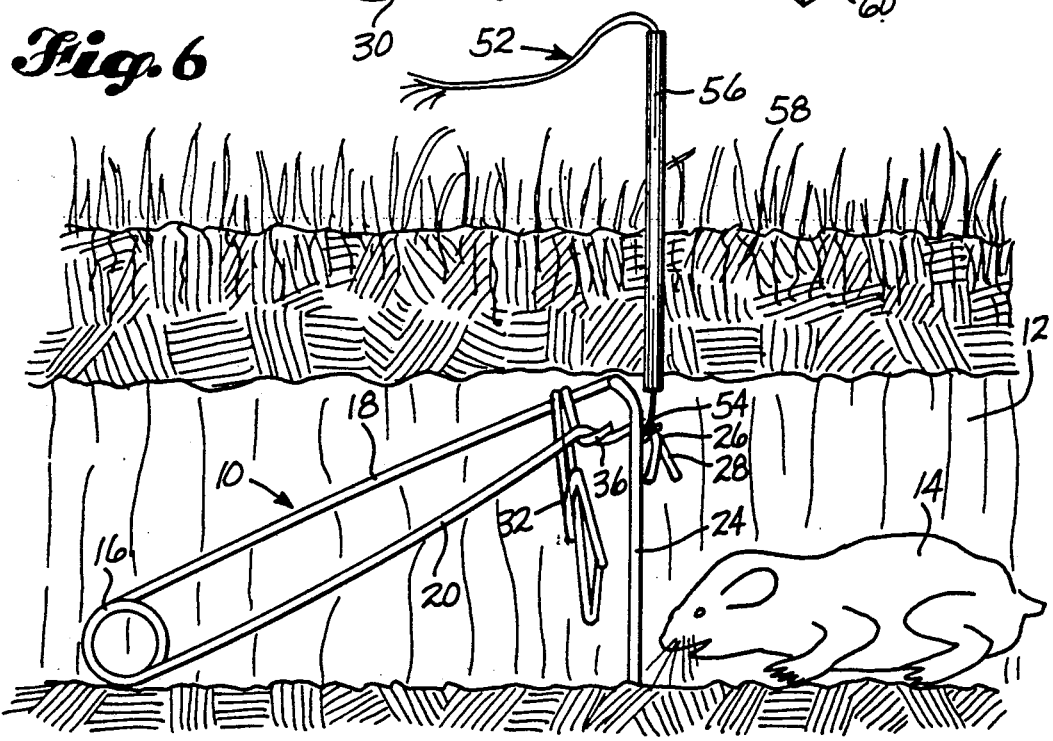

ANIMAL TRAP

DESCRIPTION

1. Technical Field

This invention relates to an improved spring-type trap for moles, gophers, rats, mice, or any other small burrowing or tunneling rodent-type pest.

2. Background Art

A wide variety of trapping devices are available for capturing and killing small pests, such as moles, gophers, rats, mice, etc., both above and below the surface of the ground. Typically, traps designed to kill or capture burrowing rodents are placed above the surface of the ground and include an impaling device which must pass through the ground prior to contacting the animal. This has the inherent disadvantage of causing much of the impaling force to be absorbed by the ground prior to reaching the animal.

Many other traps are not suitable for operation within the relatively constricted space of a mole or gopher burrow. This is often because movement of various parts relative to one another require an enlarged envelope of space in order to move properly from a set position to a tripped position. Other traps, such as those shown in U.S. Pat. Nos. 1,332,360 and 1,377,441, are operable within a limited space but, like many clamping jaw-type traps, will not be completely effective unless the animal is in a specific position to be impaled by the jaws' teeth.

SUMMARY OF THE INVENTION

The present invention provides an animal trap having a spring means with first and second arm members extending from the spring means to outward ends. The outward ends are biased apart by the spring means. A loop portion is on the first arm member and is positioned to substantially encircle the outward end of the second arm member. A jaw portion is on the second arm member and is positioned to be biased toward a side of the loop portion. A trigger member is movably carried by the first arm member and includes a paddle portion and a detent portion. The paddle portion is positionable in substantially axial alignment with the loop portion when the detent portion is positioned to hold the outward end of the second arm member relatively adjacent the outward end of the first arm member. In this position, the spring means has stored spring energy such that movement of the trigger member will release the outward end of the second arm member from the detent portion causing the jaw portion to forcefully clamp the animal within the loop portion.

In this manner, the trap of the present invention is operable in a space no larger than that required to house the trap in a set position. Furthermore, because the capturing means is a jaw portion which moves across the loop portion and against an opposite side, the animal is much more likely to be caught or actually struck and, as a result, clamped within the loop portion.

Many other features and aspects of the present invention will become apparent upon examination of the accompanying drawings, description of the best mode for carrying out the invention, and appended claims, all of which are incorporated into this disclosure.

BRIEF DESCRIPTION OF THE DRAWINGS

Like reference numerals are used to indicate like parts throughout the various views of the drawing, wherein:

FIG. 1 is a pictorial view of a trap according to the preferred embodiment of the invention shown in a section of mole or gopher tunnel with the trap in a cocked position;

FIG. 2 is a pictorial view of the trap shown in FIG. 1, in a released position;

FIG. 3 is a side view of the trap shown in FIG. 1, showing the manner in which an animal is trapped;

FIG. 4 is an end view of the trap in a cocked position;

FIG. 5 shows an alternate embodiment of the invention for freestanding use, including a base and cover means;

FIG. 6 is a side view of the trap in a gopher tunnel, showing a trap status signal feature; and FIG. 7 is a pictorial view of an alternate embodiment of the trap showing a widened impaling bar.

BEST MODE FOR CARRYING OUT THE INVENTION

Referring to the various figures of the drawing, and first to FIG. 1, therein is shown at 10 a preferred embodiment of an animal trap according to the present invention which is installed in a cocked position within the burrow or tunnel 12 of a mole or gopher-type animal 14. Referring also to FIGS. 2 and 4, the trap 10 includes a spring means in the form of a coiled torsional spring 16. Biased apart by the spring 16 are first and second arm members 18, 20. Attached to the outward end 22 of the first arm member 18 is a loop portion 24 dimensioned to be of a diameter sufficient to allow the head or most of the body of the animal desired to be trapped to pass through the loop portion 24. The outward end 26 of the second arm member 20 includes a jaw portion 28. The loop portion 24 is positioned to encircle the outward end 26 of the second arm member 20. In this manner, jaw portion 28 is positioned to move substantially diametrically across the loop portion 24 from a cocked position (FIGS. 1 and 4) in which the outward end 26 of the second arm member 20 is relatively adjacent the outward end 22 of the first arm member 18, toward a tripped position (FIG. 2) in which the jaw portion 28 is biased by the spring 16 toward a side 30 of the loop portion 24 which is substantially opposite the outward end 22 of the first arm member 18.

A trigger member 32 is movably carried by the first arm member 18. In this manner, when the trap 10 is in a tripped position (FIG. 2), the trigger member 32 is slidably movable along the length of the first arm member 18. The trigger member 32 is also movable relatively around the first arm member 18. This allows the trigger member 32 to rotate laterally away from the second arm member 20 as it moves from a cocked position to a tripped position, so as not to interfere in any way with the swift and direct movement of the jaw portion 28.

The trigger member 32 includes a hanger portion 34 which loops over the first arm member 18 in order to hold the trigger member 32 in place. The trigger member 32 also includes a detent portion 36 in the form of a forwardly-extending finger to form a relatively open hook throat. The detent portion 36 or finger engages the second arm member 20 to hold the trap 10 in a cocked or set position as shown in FIGS. 1 and 4. In the cocked position, the second arm member 20 has stored spring energy from the spring means 16 which forcefully biases it in a direction away from the first arm member 18. In this manner, the trigger member 32 is put into tension in the region between the detent 36 and the hanger portion 34 by the first and second arm members 18, 20.

The trigger member also includes a trip pan or paddle portion 38 creating an increased area of abutment against which the animal 14 will address or contact as it attempts to pass through the loop portion 24. As best viewed in FIG. 4, the paddle portion of the trigger member 32 is enlarged to mostly, but not completely, close the passageway presented through the loop portion 24.

In preferred form, the entire trigger member 32 is formed of a single length of metallic wire material which is looped and bent into a shape, as shown, capable of performing the necessary functions. These functions structurally include an outwardly-extending detent portion 36 capable of holding the second arm member 20 in a position relatively adjacent the first arm member 18 and capable of releasing the second arm member 20 in response to relatively slight movement of the trigger member 32. The relatively enlarged paddle portion 38 of the trigger member 32 extending downwardly from the detent portion 36 effectively occludes the passageway through the loop portion 24 such that any animal 14 attempting to pass therethrough will necessarily have to press against the paddle portion 38 of the trigger member 32. By being formed of a looped wire material, the paddle portion 38 is not perceived by the animal 14 as being a complete blockage and is more likely to attempt to clear its path ahead by pressing on the trigger member 32. The trigger member 32 may also be provided with a skewer end 40 which is relatively centered in the paddle portion 38 such that bait may be held thereon, if desired.

The loop portion 24, first arm member 18, spring means 16, second arm member 20, and jaw portion 28 may all be formed of a unitary piece of heavy gauge wire material. In this manner the trap 10 is both extremely durable and inexpensive to manufacture. Depending upon the temper of the wire used and traps strength desired, the spring means 16 may be formed using either a single or multiple loop. A multiple loop, torsional spring, as shown, is preferred in that it will allow setting and release of the trap 10 many times without any significant decrease in performance and will provide a more stable base upon which the trap 10 may rest to hold the loop portion 24 in an upright position.

The exact nature of the jaw portion 28 may vary according to the particular animal 14 intended to be trapped. In a very simple form, the wire of the outward end 26 of the second arm member 20 may be longitudinally split and bent radially apart in a shear direction, as shown. This presents a widened jaw region with relatively sharp edges. Referring to FIG. 7, if desired, an alternate jaw portion 28' may be employed. In this embodiment, the outward end 26 of the second arm member 20 is provided with a loop 42 onto which a crossbar member 44 is attached, as by spot welding or the like. The loop 42 provides a two-point attachment region to add stability and durability. The crossbar member 44 may also include sharpened teeth 46. These teeth 46 can operate either to impale the animal 14 being trapped, thereby providing a swift and humane death, or will at least more securely capture the animal 14 between the jaw portion 28' and the opposite side 30 of the loop portion 24.

Referring to FIG. 4, if desired, the loop portion 24 may be provided with an outwardly-extending alcove region 48 to provide ease of setting the trap or to allow the jaw portion 28 to be held in a more widely open position when the trap 10 is set. If desired, the loop portion 24 may include a flattened or stabilizing area at the bottom (not shown) to help keep the trap in an upright position. This, however, is usually deemed unnecessary.

In use, the trap 10 is set by grasping the first and second arm members 18 and squeezing them together, thereby creating stored spring energy in the spring means 16. The detent portion 36 or finger of the trigger member 32 is then moved into position to hold the second arm member 20. To facilitate this, the outward end 26 of the second arm portion may include a transverse bend 50. The transverse bend 50 provides an abutment against which the detent portion 36 may rest so that the detent portion 36 may be directed substantially toward the loop opening. This assures that an animal moving through the loop portion 24 and against the trigger member 32 will be most likely to push the trigger member 32 in a direction which will cause the instant release of the second arm member 20. The transverse bend 50 may also compensate for the inherent width of the spring means 16, when in the form of a coiled torsional spring, so as to move the jaw portion 28 into proper alignment relative to the outward end 22 of the first arm member 18 and opposite side 30 of the loop portion 24. Although the latter advantage would not be achieved, a less desirable but fully functional embodiment could be made by simply providing a transversely-extending member (not shown) attached to the second arm member 20 in an appropriate position to engage the detent portion 36 of the trigger member 32.

Once the trigger member 32 is positioned, the squeezing pressure on the first and second arm members 18, 20 may be released and they will be held in position by the trigger with stored spring energy. In this position, the trap 10 is set or cocked. When trapping burrowing or tunneling animals 14, the set trap 10 is placed within the tunnel or burrow 12 along a passageway in which the animal 14 is expected to travel. The loop portion 24 of the trap 10 should be placed facing in the direction from which the animal 14 is expected to arrive. If the animal's direction of travel is unknown, two traps should be set adjacent one another with the loop end of each trap facing in opposite directions.

Referring to FIGS. 1, 3 and 6, a burrowing animal, such as a mole or gopher 14, will encounter the trap 10 in the pathway of its burrow or tunnel 12. A loop portion 24 being sized to have a diameter approximately equal to or only slightly smaller than that of the burrow or tunnel 12 will prevent the animal 14 from passing around the trap 10 without passing through the loop portion 24. The animal 14 will proceed to attempt to pass through the loop portion 24 with its head or a portion of its body, depending upon the animal's relative size. The animal 14 is not likely to perceive a significant obstruction by the relatively open nature of the paddle portion 38 of the trigger member 32. When the animal 14 presses on the trigger member 32, even with a relatively light force, movement of the trigger member 32 will release the second arm member 20 from the detent portion 36 of the trigger 32, allowing the jaw portion 28 to sweep across the loop portion 24 and forcefully strike the animal 14 and capture it with clamping force against the opposite side 30 of the loop portion 24. This action does not require the movement of any portion of the trap 10 beyond the envelope of space which it occupies when in a set position. The trigger member 32 is free to fall or be pushed away as the second arm member 20 moves.

According to an alternate embodiment of the invention, as shown in FIG. 6, the trap 10 may also include a status indicator means which is particularly useful when the trap 10 is set in an underground burrow, thereby obscuring it from plain view. The status indicator may be in the form of a flag 52 which is attached by means of a flexible string or cord 54 to the outward end 26 of the second arm member 20. In order to allow free movement of the cord 54 and flag 52, the cord 54 may pass through a tubular conduit 56 which is positioned to pass through the upper portion of the ground 58, connecting the burrow or tunnel 12 with the above ground location of the indicator flag 52. The cord 54 and flag 52 are sized such that relative downward movement of the second arm member 20 causes the flag 52 to be retracted within the tube 56 or at least moved to a significant extent to indicate that the trap 10 has been activated.

Referring now to FIG. 5, therein is shown another alternate embodiment of the invention particularly for use in open spaces. This embodiment includes a base member 60 and a cover 62. The base 60 is sized to support the trap 10 securely on a relatively flat surface. The cover 62 may be shaped as a tunnel having a substantially uniform cross-section along its length or may be tapering in cross-section from a larger open end 64 toward a closed end 66, as shown. The exact shape of the cover 62 is not critical, except that the open end 64 be sized appropriately to allow insertion of the trap 10 and to relatively closely conform with the size and shape of the loop portion 24 such that any animal attempting to enter the cover 62 seeking bait, which may be placed on the skewer 40 of the trigger 32, must first insert its head or body through the loop portion 24. Spaces between the loop portion 24 and open end 64 of the cover 62 should be sufficiently small so as not to allow subject animals to fit therebetween.

Use of this embodiment is particularly useful in open spaces for trapping rats and mice. In such a situation, because the rats or mice are likely to be seeking bait on the trigger member 32 rather than trying to press by it, it may be necessary to increase the sensitivity of the trigger member 32. This is accomplished simply by a slight bending of the detent portion 36 of the trigger member 32, providing either a more open or more closed hook throat, as desired, to increase or decrease the sensitivity, respectively.

Many changes may be made to the embodiments described above and illustrated in the drawings without departing from the spirit and scope of the invention disclosed herein. For example, the overall size and shape of the trap 10 may be changed according to the nature of the animal to be trapped or location of the trap's use. Other structure may be used to accomplish the disclosed functions as desired, keeping in mind that the disclosed embodiments are merely exemplary of the invention. Therefore, patent protection is not to be limited in any way by the embodiments described or illustrated, but rather only by the following appended claim or claims interpreted according to accepted doctrines of claim interpretation, including the doctrine of equivalents.

What is claimed is:

1. An animal trap, comprising:
   a spring means;
   first and second arm members extending from said spring means to outward ends, said outward ends being biased apart by said spring means;
   a loop portion on said first arm member positioned to substantially encircle the outward end of said second arm member;
   a jaw portion on said second arm member positioned to be biased toward a side of said loop portion opposite said first arm member; and
   a trigger member movably carried by said first arm member, said trigger member including a paddle portion and a detent portion;
   said paddle portion positionable in substantial axial alignment with said loop portion when said detent portion is positioned to hold the outward end of said second arm member in a position relatively adjacent the outward end of said first arm member with stored spring energy such that movement of said trigger member will release the outward end of said second arm member causing the jaw portion to be moved by said spring means across said loop portion toward said side opposite said first arm member to forcefully clamp the animal within said loop portion;
   wherein said jaw portion includes a longitudinal split substantially along a longitudinal plane in said outward end of said second arm member and portions on each side of said split being bent apart radially outwardly in a shear direction substantially parallel to said plane.

2. An animal trap, comprising:
   a spring means;
   first and second arm members extending from said spring means to outward ends, said outward ends being biased apart by said spring means;
   a loop portion on said first arm member positioned to substantially encircle the outward end of said second arm member;
   a jaw portion on said second arm member positioned to be biased toward a side of said loop portion opposite said first arm member; and
   a trigger member movably carried by said first arm member, said trigger member including a paddle portion and a detent portion;
   said paddle portion positionable in substantial axial alignment with said loop portion when said detent portion is positioned to hold the outward end of said second arm member in a position relatively adjacent the outward end of said first arm member with stored spring energy such that movement of said trigger member will release the outward end of said second arm member causing the jaw portion to be moved by said spring means across said loop portion toward said side opposite said first arm member to forcefully clamp the animal within said loop portion;
   wherein said jaw portion includes a transverse bar member which extends substantially transversely across said loop portion, and
   wherein said transverse bar member includes a plurality of tooth members directed toward said side of said loop portion opposite said first arm member.

* * * * *